Figure 6:
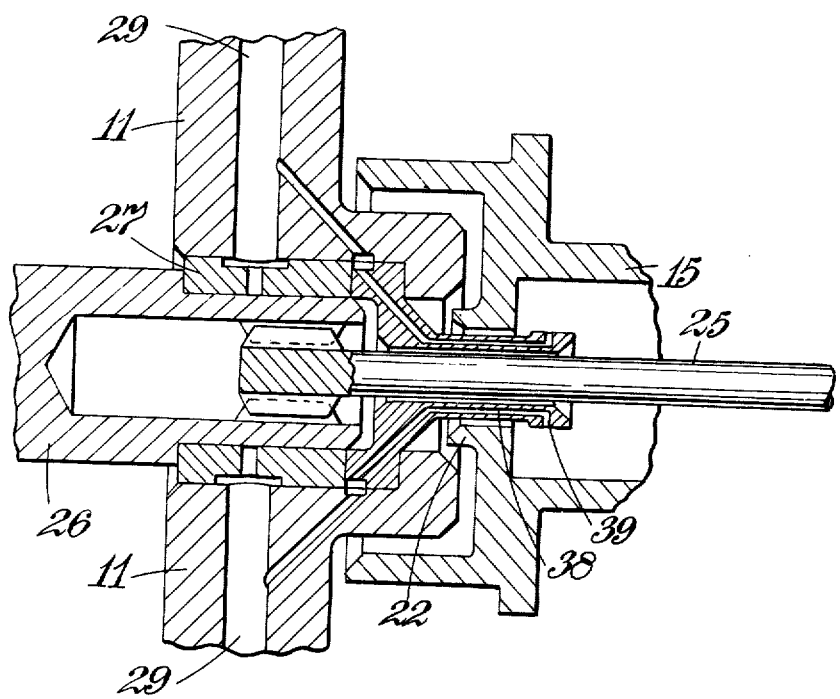

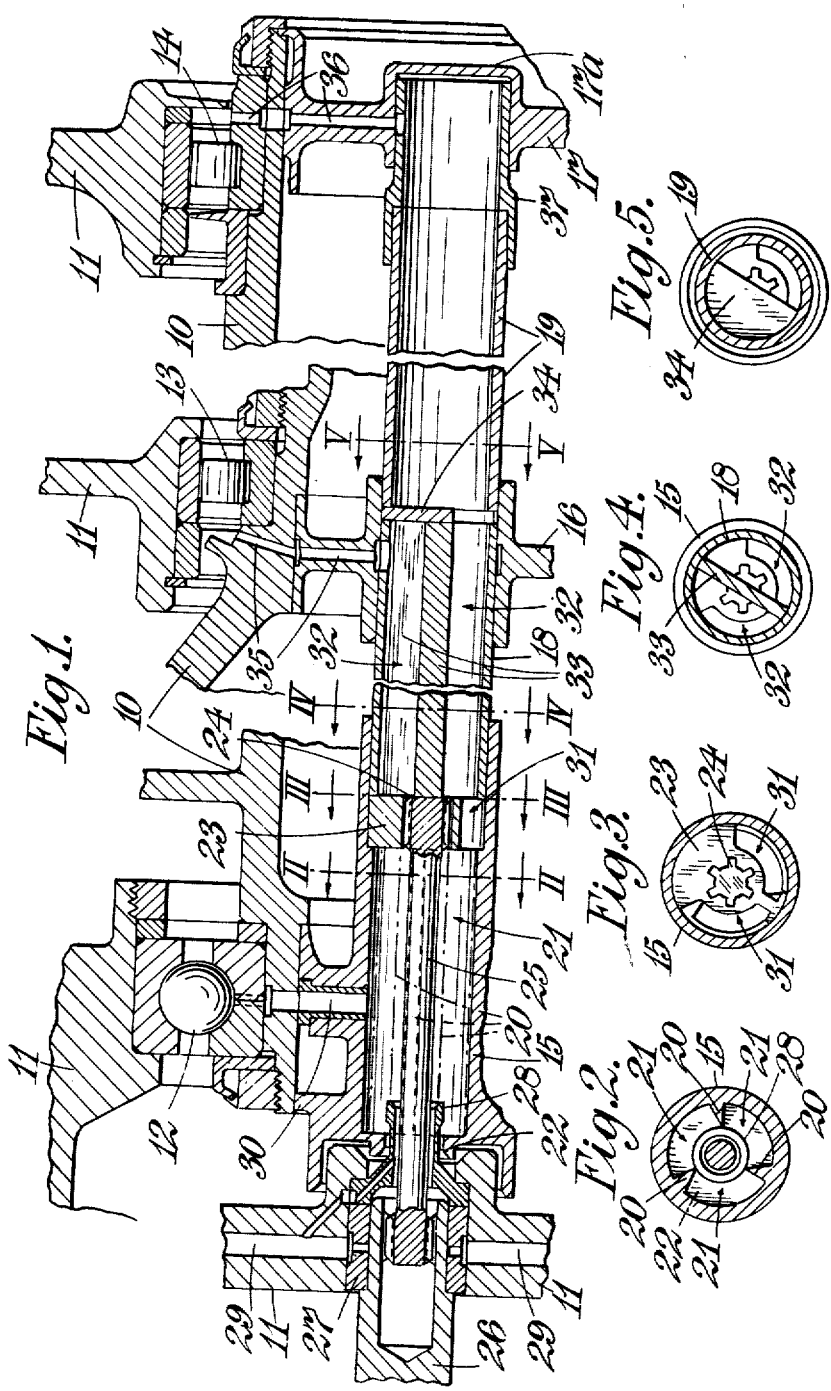

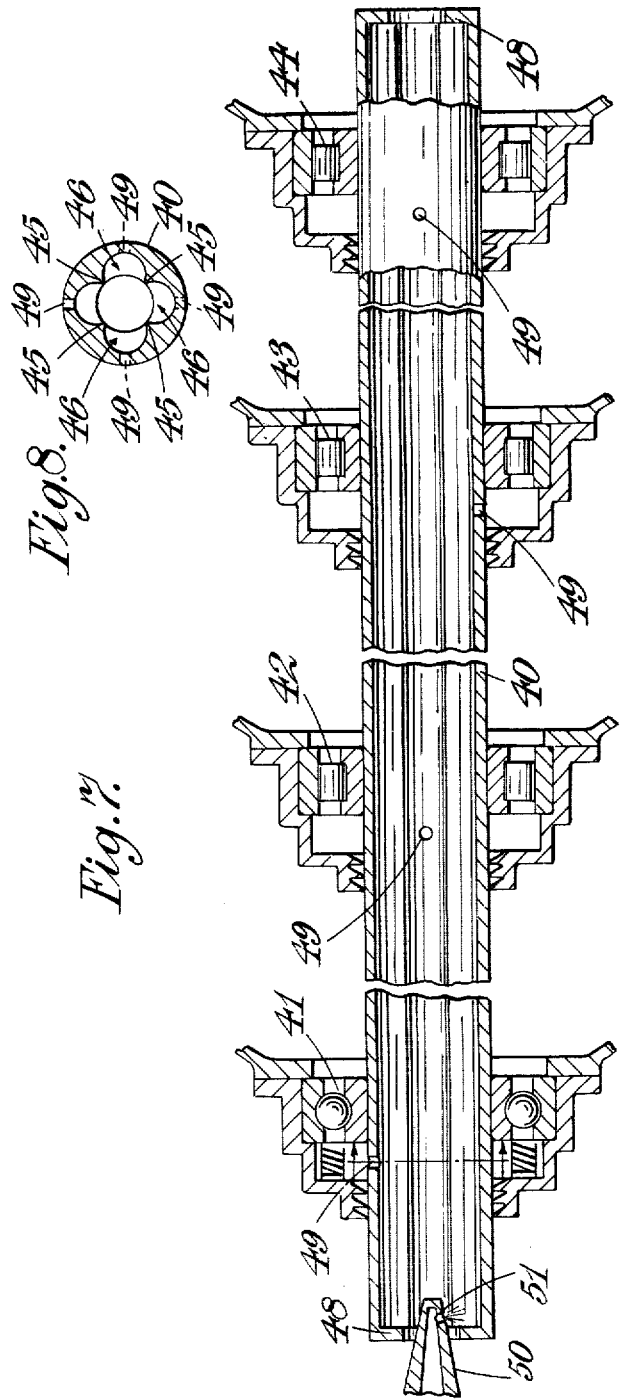

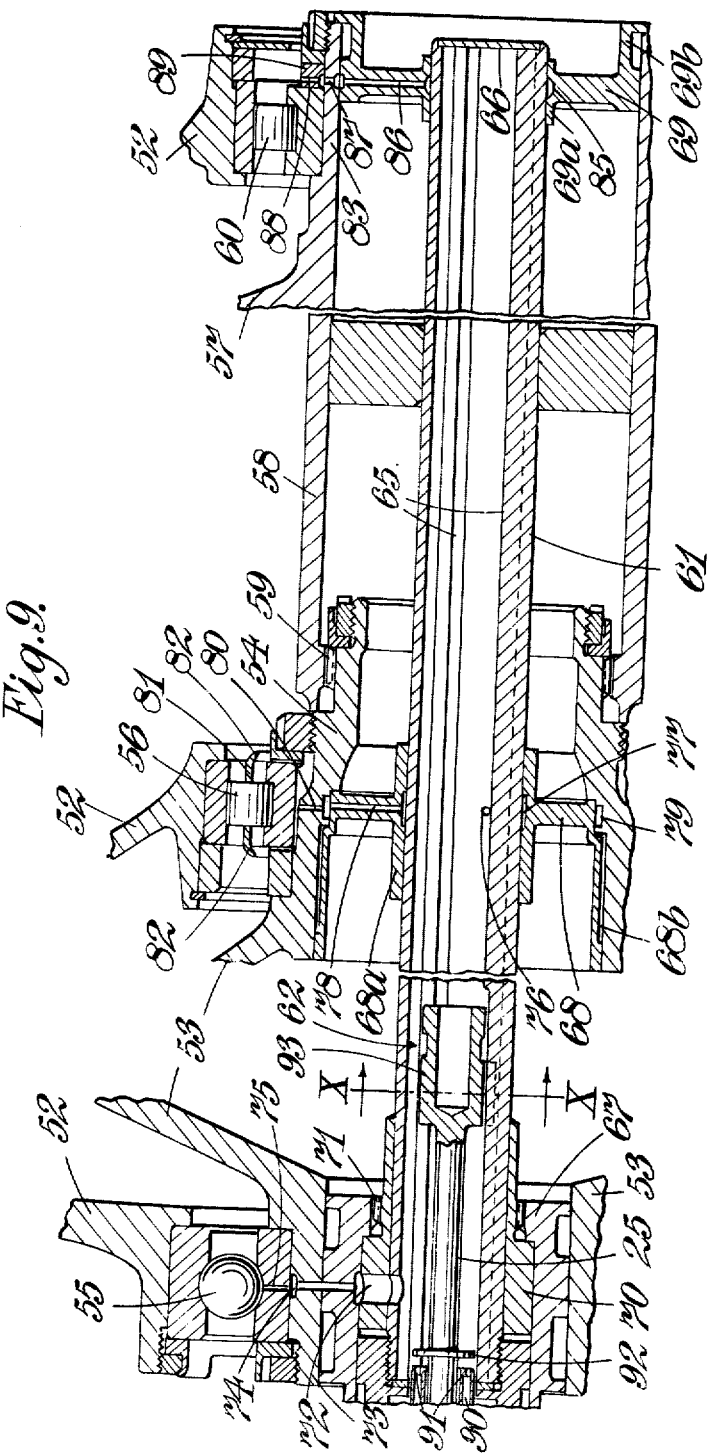

July 12, 1955  P. SUTTON  2,712,967
LUBRICATING ARRANGEMENTS FOR ROTATING PARTS
Filed Jan. 29, 1954                              5 Sheets-Sheet 5
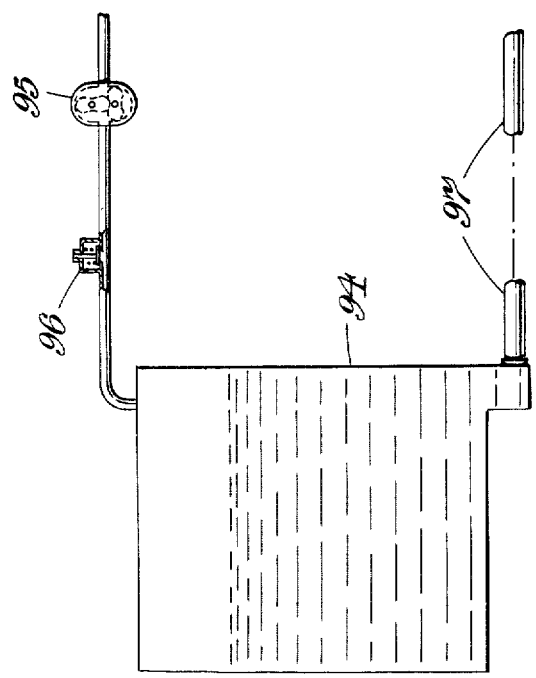
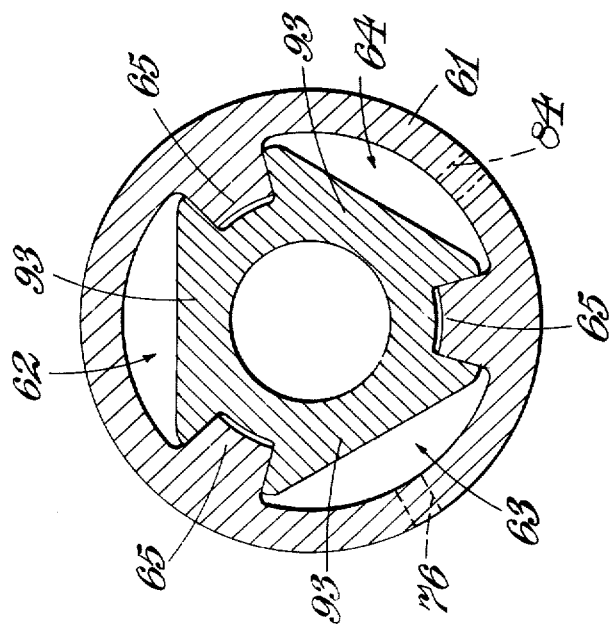

United States Patent Office 2,712,967
Patented July 12, 1955

2,712,967
LUBRICATING ARRANGEMENTS FOR ROTATING PARTS

Peter Sutton, Spondon, England, assignor to Rolls-Royce Limited, Derby, England, a British company Application January 29, 1954, Serial No. 407,080

Claims priority, application Great Britain February 6, 1953

14 Claims. (Cl. 308—187)

This invention relates to lubricating arrangements for rotating parts such as shafts which are supported in bearings in a stationary structure, and has for an object to provide an improved lubricating arrangement whereby a metered supply of lubricant is distributed to the bearings in a desired manner.

According to the present invention, a lubricating arrangement for a rotating part supported in bearings in stationary structure comprises an axial bore in the part with webs extending inwards from the wall of the bore to form a number of lengthwise channels open towards the centre of the bore, means to deliver a metered quantity of lubricant to the bore to be distributed in the channels, and outlet means to convey the lubricant away from each of a plurality of the channels as separate streams to a corresponding plurality of bearings.

It is intended that the term lubricant shall include any liquid, such as water, to be distributed to bearings for lubricating and/or cooling purposes.

In operation, it will be arranged that the quantity of lubricant fed to the bore is insufficient to fill the bore and that the channels act as feed troughs for the lubricant. Where necessary means will be provided at the ends of a channel to confine the lubricant received in the channels against end-wise spillage.

According to a feature of the invention, the rotating part is supported in a plurality of axially spaced bearings and the number of channels is equal to the number of bearings and the outlet means are arranged so that oil is fed from the channels each to a corresponding bearing. In such an arrangement the channels may extend the whole length of the bore with the outlet means formed by radial drillings at appropriate locations in the length of the respective channels, or the channels may extend part way only along the bore, the outlet means being for instance in the form of axial ducts in the bore each in communication with a channel at its end.

According to another feature of the invention, the webs separating the channels may be tapered towards the centre of the bore and either provided with plane walls with the trailing wall of the channel (considered in the direction of rotation), radially extending, or inwardly and forwardly extending in the direction of rotation, or with curved walls so that the channels are of curved section.

According to another feature of this invention, the means to prevent spillage of lubricant from an end of the channels may comprise a radial flange at the end of the channels which has a radial extent substantially equal to the radial extent of the webs.

According to another feature of this invention, the means to prevent spillage may be in the form of a plug or disc between sections of the rotating part, if necessary with outlet ports in the plug or disc to axial continuation ducts.

According to another feature of this invention, the means to deliver a metered quantity of lubricant to the bore may comprise a reservoir for the lubricant, a nozzle connected with the reservoir and arranged to deliver lubricant into the bore of the rotating part, for instance into the bore of a hollow shaft, the reservoir being arranged to be pressurised to deliver the lubricant from the tank through the nozzle into the bore of the rotating part.

The nozzle may comprise a jet which may be radially or axially directed, in the latter case it may be arranged that the lubricant impinges on a transversely-extending surface of an element within the bore and which rotates with the bore. The bore and channels are so designed in relation to the flow required, that the rate of flow of lubricant through the jet is insufficient to fill the bore and also insufficient to permit filling of the channels.

Some embodiments of lubricating arrangement according to this invention will now be described with reference to the accompanying drawings in which:

Figure 1 illustrates in axial section the lubricating arrangement for a rotating part supported in three bearings, Figures 2, 3, 4 and 5 are sections on the lines II—II, III—III, IV—IV, V—V of Figure 1, Figure 6 shows a modification of the arrangement of Figure 1, Figure 7 is a view corresponding to Figure 1 of the second arrangement, Figure 8 is a section on the line VIII—VIII of Figure 7, Figure 9 is a view corresponding to Figure 1 of another arrangement, Figure 10 is a section on the line X—X of Figure 9 and Figure 11 illustrates a detail.

Referring to Figures 1 to 5, the rotating part 10 to be supported in stationary structure 11 is carried in three bearings 12, 13 and 14 spaced axially of the part 10.

The rotating part 10 is hollow and has fitted in it adjacent the bearings 12, 13, and 14 corresponding oil feed fittings 15, 16 and 17 respectively and lubricating oil is fed to the fittings 15, 16 and 17 by an arrangement according to this invention.

The fittings 15 and 16 are interconnected by conduit 18 and the fittings 16 and 17 are interconnected by conduit 19, and the conduits 18 and 19 and the fittings 15, 16 and 17 are all coaxial with the rotating part 10.

The fitting 15 associated with the end bearing 12 is formed as a distributor by which the lubricant fed to the lubricating system is divided into a number of streams corresponding to the number of bearings, in this case three streams, and for this purpose the fitting 15 has a central bore with the walls of the bore provided with inwardly-projecting webs 20 which are equi-angularly spaced around the wall of the bore and are of inwardly tapering cross section. The webs have plane walls and each of the circumferentially-facing trailing walls of the channels 21 formed between the webs 20 is contained in an axle and radial plane so as to reduce any tendency for oil fed into the channels to splash into an adjacent channel.

One end of the fitting 15 is formed with a radially-inwardly-projecting flange 22 which blanks-off the adjacent ends of the channels 21 and the opposite ends of the channels 21 are formed with end walls by means of an annular plug 23.

The annular plug 23 has, as will be seen best from Figure 3, a central splined hole 24 which is engaged by one splined end of a quill shaft 25 coaxial with the fitting 15 and extending from it to be drivingly connected with a shaft 26 so that the latter may be driven from the rotating part 10. The shaft 26 is mounted in a bearing 27 in the stationary structure 11 to be coaxial with a lubricating oil feed nozzle 28 which encircles the quill shaft 25 and is fixed to the stationary structure 11. Lubricating oil is fed to the nozzle 28 through ducts 29 in the fixed structure 11 and the oil flows through passages in the structure 11 and the nozzle 28 and around the quill shaft 25 to the nozzle 28 to be delivered into the bore of the fitting 15.

In an alternative and preferred arrangement shown in Figure 6, the part 28 may be formed internally with an annular channel 38 and a jet or jets 39 may be formed in the end of the part for the injection of lubricant. The jets may be radial (as shown), or they may be generally axial and arranged so that the lubricant impinges on a transverse plate within the bore which rotates with the bore. In this case the jets may be skewed in the direction of rotation.

The oil entering the bore of the fitting 15 is distributed equally between the channels 21 and it is arranged that insufficient oil is fed to the bore to fill the channels.

The oil from one channel 21 is led away through a drilling 30 in the fitting 15 to lubricate the bearing 12. The inner race of the bearing may be formed in two parts, which may be grooved on their adjacent faces to provide an oil feed passage.

The oil in the two remaining channels 21 is led away through ports 31 formed in the plug 23 to enter a pair of ducts 32 formed in the bore of conduit 18 by a transverse wall 33. The transverse wall 33 is arranged so that each port 31 opens into a corresponding duct 32 whereby the oil supplies from the two channels 21 to ducts 32 are kept separate.

The end of one of the ducts 32 in the conduit 18 is closed off by a segmental plate 34 fitted between the ends of the conduits 18 and 19 where they meet in the fitting 16, and an oil outlet is provided from this duct 32 by drillings 35 in the fitting 16 and rotating part 10, leading to the bearing 13.

The oil fed into the other of the two ducts 32 from a channel 21 flows into the conduit 19 past the plate 34 and is led out from the conduit 19 at the end thereof remote from the fitting 16 through drillings 36 in the fitting 17 and rotating part 10 to lubricate the bearing 14. The end of the conduit 19 is fitted with a ferrule 37 engaged in the fitting 17 and the end of the passage through the conduit 19 is closed off by a wall 17a formed in one piece with the fitting 17.

It will be seen that the part having the bore with inwardly-extending webs 20 in this case acts as a distributor and the webs 20 do not extend for the full length of the rotating part.

If desired, however, the rotating part may be formed with channel-forming webs which extend substantially over the whole length of the part and such an arrangement is illustrated in Figures 7 and 8.

Referring to these figures, there is illustrated a shaft 40 supported in four bearings 41, 42, 43, 44, which are required to be supplied with lubricant.

The shaft 40 is therefore formed internally with a corresponding number of inwardly-projecting webs 45 which taper towards the axis of the shaft and which are so shaped as to form channels 46 of curved cross section in the wall of the bore through the shaft 40, the channels 46 being open towards the centre of the bore and being equal in number to the number of bearings. At each end of the shaft there is provided an inwardly-directed radial flange 48 which provides end walls for the channels 46 and one outlet is provided from each of the channels 46 in the form of a radial drilling 49, there being four drillings, one in each channel, located adjacent the respective bearings 41, 42, 43 and 44 to lead the oil to the bearings.

The lubricating oil is conveniently fed into the bore of the shaft 40 through a nozzle 50 projecting into one end of the hollow shaft and having a radial jet 51. As in the previous construction the rate of flow of oil into the bore of the shaft will be insufficient completely to fill the channels 46.

Referring now to Figures 9 and 10, there is illustrated an arrangement similar in certain respects to the construction of Figure 1, and in other respects similar to the construction of Figures 7 and 8.

In Figures 9 and 10 there is illustrated a lubricating arrangement suitable for lubricating the bearings of the rotor assembly of a gas-turbined engine. The stationary structure of the gas-turbine engine is indicated at 52 and the rotor assembly is indicated as comprising two parts.

The first part comprises the compressor rotor 53 which has at one end a short stub shaft 54 and which is mounted in a pair of axially-spaced bearings 55, 56, of which the bearing 55 is a journal thrust bearing and the bearing 56 is a journal bearing.

The second part comprises a turbine rotor 57 having a shaft 58 which is drivingly connected by splines 59 with the stub shaft 54 of the compressor and supported in a rear bearing 60 which is indicated as a journal bearing.

The lubricating arrangement comprises a tube 61 extending axially through the rotor assembly from adjacent the bearing 55 at the upstream end of the compressor rotor to adjacent the turbine bearing 60. The tube has a section as indicated in Figure 10 so as to afford three channels 62, 63, 64 separated by webs 65, the side surfaces of which are radial. The downstream end, that is the end adjacent the turbine 57, is blanked off by a disc 66.

The tube 61 is supported coaxially within the rotor assembly 53, 54, 57, 58 by three fittings 67, 68, 69, one of the fittings being located adjacent each of the bearings 55, 56, 60.

The fitting 67 is sleeve-like and fits on a bushing 70 welded to the tube 61 externally thereof and the fitting 67 and bushing 70 are drivingly interconnected by splines 71. A bore 72 extends radially outwards from the tube 61 through the bushing 70, fitting 67 and through a stub shaft 73 at the upstream end of the compressor 53 to a peripheral channel 74 externally of the stub shaft 73, from which radial grooves 75 in the inner race of bearing 55 lead to the running surfaces of the bearing. The inner end of the bore 72 opens to the channel 62 in the oil distributing pipe 61.

The fitting 68 comprises a central boss 68a by which it is fitted on the pipe 61 and a radial web leading to a sleeve portion 68b which fits within the stub shaft 54. A bore 76 leads from the channel 63 in the oil distributing pipe 61 to an annular groove 77 cut in the internal surface of the boss 68a and radial bores 78 run outwardly from the channel 77 to deliver lubricating oil from the channel 77 into a channel 79 formed internally of the stub shaft 54. Oil delivery passages 80 extend outwardly from the channel 79 to deliver the lubricant from the channel 63 into an inwardly-facing trough afforded by the bearing cage 81 which has inwardly-extending lips 82.

The fitting 69 has a central boss 69a, by which it fits on the external surface of the oil distributing pipe 61, and an external flange 69b which fits within a short extension 83 on the downstream side of the turbine 57 and by which the turbine 57 is engaged with its bearing 60. A bore 84 (Fig. 10) leads outwardly from the channel 64 in the oil distributing pipe 61 to an annular channel 85 cut in the internal surface of the boss 69a and radial passages 86 lead outwardly from the channel 85 to bores 87, 88 in the extension 83 and ring 89 respectively, so distributing the oil to the bearing 60.

It will be appreciated that the drillings 30, 35, 36 in Figure 1 and 72, 75, 76, 78, 80, 84, 86, 87 and 88 in Figure 9 may in all cases be provided with transfer grooves on the faces of abutting parts through which the drillings pass, and this has the advantage that the drillings need not be radially aligned on assembly.

The lubricating oil is fed into the distributing pipe 61 by means of an annular nozzle 90 similar to nozzle 28 (Figs. 1 and 6) but having axially-directed orifices 91 and the jets issuing from the orifices impinge upon a radial flange 92 on the quill shaft 25, which is similar to that shown in Figure 1. As will best be seen from Figure 10 the quill shaft 25 is provided with a series of splines 93 which drivingly co-operate with the webs 65 between the channels 62, 63, 64 of the oil distributing tube 61. The tube is conveniently formed from aluminum and may be extruded, and in this case the webs 65 may have their radially inner ends broached where they are engaged by the splines 93 to give them a more accurate form for engagement by the splines 93.

In each of the above embodiments the oil feeding nozzle 28 or 50 or 90 may be fed with oil under pressure by being connected to a pressurised oil tank 94 (as indicated in Figure 11), within which the pressure is controlled so that a metered supply of oil is fed to the bore of the oil distributing pipe. For instance, in order to control the pressure within the oil tank 94 it may be supplied with air under pressure by an air pump 95 and be fitted with a relief valve 96 so that the pressure within the tank is maintained constant. An oil delivery pipe 97 leads to the oil distributing nozzle.

I claim:

1. A lubricating arrangement for a rotating part supported in bearings in relatively stationary structure, comprising means defining an axial bore in the part with webs extending inwards from the wall of the bore part way only towards the axis of said bore to form a number of lengthwise channels open towards the centre of the bore, means to deliver a metered quantity of lubricant to the bore to be distributed in the channels, and outlet means each comprising a conduit communicating at one end with one of said channels and at its other end with one of said bearings to convey the lubricant away from each of a plurality of the channels as separate streams to a corresponding plurality of bearings.

2. A lubricating arrangement for a rotating part supported in bearings in relatively stationary structure, comprising means defining an axial bore in the part with webs extending inwards from the wall of the bore part way only towards the axis of said bore to form a number of lengthwise channels open toward the centre of the bore, the number of channels being equal to the number of bearings, means to deliver a metered quantity of lubricant to the bore to be distributed in the channels, and outlet means from each of said channels, each said outlet means comprising a conduit communicating at one end with one of said channels and at its other end with one of said bearings to convey the lubricant away from each of the channels as separate streams to the corresponding bearings, the angular extent of each channel being selected as a proportion of the total circumference of the bore in accordance with the proportion of the total flow of lubricant which it is desired to apportion to the corresponding bearing.

3. A lubricating arrangement as claimed in claim 1, wherein the channels extend the whole length of the bore, the outlet means comprising radial drillings at appropriate locations in the length of the respective channels.

4. A lubricating arrangement as claimed in claim 1, wherein the channels extend part way only along the bore, the outlet means comprising axial ducts in the bore each in communication with a channel at its end.

5. A lubricating arrangement as claimed in claim 1, wherein the webs separating the channels are tapered towards the centre of the bore and have their surfaces providing the trailing walls of the channels plane and radially-extending and their surfaces providing the leading walls of the channels extending forwardly in the direction of rotation of the rotating part.

6. A lubricating arrangement as claimed in claim 1, wherein the webs separating the channels are tapered and have curved walls so that the channels are of curved section.

7. A lubricating arrangement as claimed in claim 1, comprising also means at the end of a channel to confine the lubricant received therein against endwise spillage.

8. A lubricating arrangement as claimed in claim 7, wherein means to prevent spillage of lubricant from an end of the channels comprises a flange at the end of the channels which has a radial extent substantially equal to the radial extent of the webs.

9. A lubricating arrangement as claimed in claim 7, wherein the means to prevent spillage is in the form of a plug or disc between sections of the rotating part.

10. A lubricating arrangement as claimed in claim 9, wherein the plug or disc comprises outlet ports leading to axial continuation ducts.

11. A lubricating arrangement as claimed in claim 1, wherein the means to deliver a metered quantity of lubricant to the bore comprises a reservoir for the lubricant, a nozzle, and means connecting the nozzle with the reservoir, the nozzle being positioned to deliver lubricant into the bore of the rotating part, and means to pressurise the reservoir to deliver the lubricant from the tank through the nozzle into the bore of the rotating part.

12. A lubricating arrangement as claimed in claim 11, wherein the nozzle comprises a radially-extending jet orifice.

13. A lubricating arrangement as claimed in claim 11, wherein the nozzle comprises an axially-extending jet orifice.

14. A lubricating arrangement as claimed in claim 13, comprising an element rotatable with the rotating part and in its bore, and having a transverse surface so positioned that the lubricant issuing from the nozzle impinges against it.

References Cited in the file of this patent

UNITED STATES PATENTS

| | | |
|---|---|---|
| 1,200,881 | Sargent | Oct. 10, 1916 |
| 2,457,999 | Hulbert | Jan. 4, 1949 |

FOREIGN PATENTS

| | | |
|---|---|---|
| 118,121 | Austria | June 25, 1930 |